United States Patent
Rieder et al.

[19]

[11] Patent Number: 6,071,613
[45] Date of Patent: Jun. 6, 2000

[54] FIBER REINFORCED CEMENTITIOUS MATERIALS WITH IMPROVED TOUGHNESS AND DUCTILITY

[75] Inventors: Klaus Alexander Rieder, Arlington; Neal S. Berke, North Chelmsford, both of Mass.

[73] Assignee: W. R. Grace & Co.-Conn., New York, N.Y.

[21] Appl. No.: 09/185,253

[22] Filed: Nov. 3, 1998

[51] Int. Cl.[7] .............................. D02G 3/00; B32B 27/00; E04C 5/00

[52] U.S. Cl. .......................... 428/378; 428/364; 428/369; 428/370; 428/371; 428/375; 428/378; 428/383; 428/400; 428/401; 428/606; 106/638; 106/713; 423/445 R; 423/447.1; 423/447.2

[58] Field of Search ...................................... 428/378, 408, 428/902, 364, 368; 106/638, 713; 423/445 R, 447.1, 447.2

[56] References Cited

U.S. PATENT DOCUMENTS 4,565,840  1/1986  Kubayashi et al. ........................ 524/8

FOREIGN PATENT DOCUMENTS

W/O
98/27022  6/1998  WIPO .

OTHER PUBLICATIONS

"Fatigue Crack Fracture and Arrest in Fiber Reinforced Concrete Under Interfacial Bond Degradation", T. Matsumoto and V.C. Li, pp. 541–550. No Date.
"Flexural Characteristics of Steel Fibre and Polyethylene Fibre Hybrid–Reinforced Concrete", K. Kobayashi and R. Cho, Apr., 1982, pp. 164–168.
"Cement–Based Composites with Mixtures of Different Types of Fibres", P.L. Walton and A.J. Majumdar, Sep. 1975, pp. 209–216.
"Micro–Reinforced Cementitious Materials", Nemkumar Banthia and Jiakang Sheng, 1991, pp. 25–32.

Primary Examiner—Richard Weisberger
Attorney, Agent, or Firm—Craig K. Leon; William L. Baker

[57] ABSTRACT

A hybrid fiber reinforcing system that enhances ductility of concrete at small and large crack openings, while avoiding the necessity of using steel fibers at high (e.g., 1%) volumes, by taking into account Young's modulus, deploying large surface area to volume ratios for improved anchorage, and using different relative lengths.

14 Claims, 1 Drawing Sheet

Load deflection curves for concrete with different fibers.

Load deflection curves for concrete with different fibers.

FIBER REINFORCED CEMENTITIOUS MATERIALS WITH IMPROVED TOUGHNESS AND DUCTILITY

FIELD OF THE INVENTION

The present invention relates to fiber reinforcing systems for cementitious materials, and more particularly to a hybrid fiber-reinforcement system and fiber reinforced concrete having improved toughness and ductility.

BACKGROUND OF THE INVENTION

Concrete, which is made from a hydraulic cement binder and fine and course aggregates, is known to be a fairly brittle material. If its maximum tensile strength is exceeded, then crack initiation and propagation will occur. The concepts of "flexural strength" and "fracture toughness" are useful for understanding crack behavior in concrete.

Flexural strength is related to the critical stress intensity factor, e.g., the ability of a structure to resist crack initiation. Since it is proportional to the maximum sustainable load, flexural strength is measured as the minimum load or stress required to initiate or start a crack under flexural loading.

Fracture toughness is related on the other hand to the specific "fracture energy" of a concrete, e.g., the ability to resist the propagation or widening of an opened crack. This toughness property is proportional to the energy required to propagate or widen a crack. This property can be determined by simultaneously measuring the load, which is required to deform or "deflect" a fiber-containing concrete (FRC) sample at an opened crack, and the amount of deflection. Toughness is therefore determined by dividing the area under a load deflection curve generated from plotting the load against deflection of the specimen by its cross-sectional area.

The "ductility" of a material is closely related to the characteristic length $l_{ch}$, which is directly proportional to the ratio of the fracture energy, $G_F$, and the stored elastic energy at the maximum load, $G_{Ic}(l_{ch}\ G_F/G_{Ic})$.

The fracture toughness or energy of non-reinforced concrete is very low, somewhere in the range of 50 to 200 N/m. This low fracture toughness is the main reason for the high brittleness of concrete in tension and compression. Once the breaking point of non-reinforced concrete (under tension) is reached, the concrete cracks and fails (crumbles). However, it is known to use reinforcing fibers in concrete to increase the amount of energy required to bring the concrete to a state of complete separation of its fracture surfaces. Various fibers made of steel, polyolefin, carbon, nylon, aramid, and glass have been suggested for such use.

In an article entitled "Flexural Characteristics of Steel Fibre and Polyethylene Fiber Hybrid-Reinforced Concrete," Kobayashi and Cho described a fiber-reinforced concrete made by dispersing discontinuous steel and polyethylene fibers in a randomly oriented state into the concrete to provide it with both strength and toughness. K Kobayashi and R. Cho, *Composites*, Vol. 13 (Butterworth & Co. Ltd. 1982), pp. 164–168.

Kobayashi and Cho used one (1) percent by volume of steel fibers made by shearing cold-rolled steel, the dimensions being 0.35 mm×0.7 mm×30 mm, and one-three percent by volume of polyethylene fibers having a length of 40 mm and a (circular) diameter of 0.9 mm. The steel fibers provided flexural strength by resisting crack initiation, and the polyethylene fibers provided fracture toughness by providing pull-out resistance and viscoelastic ability. This hybrid steel/polyolefin system overcame the singular deficiencies of either steel or polyolefin fibers used alone. In other words, steel fibers increased first-crack strength which the polyethylene fibers did not do when used alone; while the polyethylene fibers increased strength after crack formation which the steel fibers did not do when used alone. However, Kobayashi and Cho taught that their steel fibers should be used at one percent (1%) volume, above which there was extreme loss of fluidity in the concrete.

In World Patent Application WO 98/27022, J. Seewald disclosed a high strength concrete having enhanced ductility using 30–200 kg/m3 of inorganic (e.g., steel) fibers (approximately 0.4–2.6 percent volume) along with a smaller amount of organic fibers having a low elasticity modulus. Although Seewald taught using preferably seven times as much steel fibers as polypropylene fibers, it is not clear how he resolved any fluidity problems that would certainly have been the concern of Kobayashi and Cho, as just noted above.

SUMMARY OF THE INVENTION

The present invention provides an improved hybrid fiber system for increasing the resistance of concrete to widening of small cracks as well as large deformations, thereby enhancing concrete toughness and ductility at both small and large crack openings, while avoiding high volume use of (one percent) steel fibers and their attendant expense and fluidity loss disadvantages.

The hybrid system of the present invention takes into account the use of two different fiber components in which the primary concern is achieving a high fiber surface area/fiber volume ratio and a high modulus of elasticity in one of the fiber components, and this is believed to be more important than having particular fibers made of a particular material. Indeed, the present invention may employ all steel fibers, or none whatsoever, while at the same time improving overall ductility. Increased ductility is achieved using substantially smaller fiber volume than prior art systems, because the present inventors realized that toughness is more efficiently enhanced by taking into account the behavior of the fiber-reinforced concrete (FRC) at both small and large crack openings.

An exemplary fiber system of the present invention thus comprises: (A) a first component comprising fibers having a Young's modulus of at least 30 GigaPascals and having a width to thickness ratio of 10–200 and an average length of 5–50 mm (and more preferably 5–25 mm); and (B) a second component comprising fibers having a length to diameter ratio of 25–125 (diameter may be equivalent diameter, See ACI 544.1R-5), an average length of 10–100 mm.; the volume ratio of component A to component B being at least 1:2, and more preferably at least 1:3.

The present invention also provides a cementitious composition comprising the above-described fiber system, as well as a method for increasing the ductility of a cementitious material by incorporation of the fiber system. Other advantages and features of the present invention are discussed in further detail hereinafter.

BRIEF DESCRIPTION OF THE DRAWINGS

A comprehension of the following detailed description of exemplary embodiments may be facilitated by the accompanying drawings, wherein.

Figure 1:
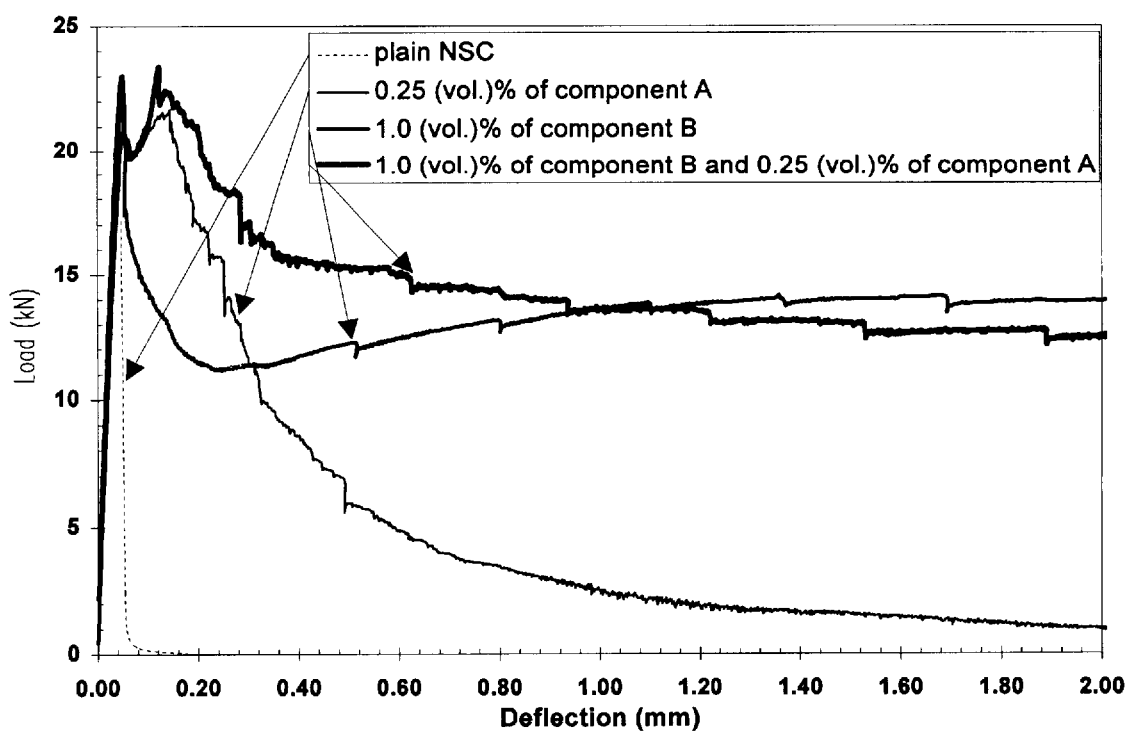
FIG. 1 is a graph of comparative load deflection curves for four different concrete test samples: plain (non-reinforced)

concrete, component A fibers only, component B fibers only, and a sample of an exemplary hybrid fiber-reinforced concrete sample of the present invention comprising both component A and B fibers.

DETAILED DESCRIPTION OF EXEMPLARY EMBODIMENTS

As previously mentioned, the term "concrete" refers to a composition containing a cement binder, usually with fine and course aggregates. As used hereinafter, however, the term means and refers to any cementitious material, such as cement, mortar cement, and masonry, into which fibers may be incorporated for purposes of reinforcing the material.

The present invention pertains to improved hybrid fiber systems, methods for reinforcing concrete (e.g., any cementitious material), as well as to concretes or cementitious compositions having improved toughness and ductility.

The first fiber component A preferably has a Young's modulus (as determined by ASTM C469 (1994)) that is at least equal to that of concrete, and is operative thereby to increase resistance of the concrete to deflection at small crack openings (e.g., microcracks and cracks that are just initiated). These may also be characterized by a high width-to-thickness ratio which translates to a high fiber surface area to fiber volume ratio. This higher fiber surface area to fiber volume characteristic means that the flexural strength, as well as the toughness and ductility of the concrete, can be improved (as compared to concrete without the fibers) using a relatively smaller dosage rate (0.1–0.4% by volume). Fiber component A, is in preferred embodiments, has a "flat noodle" or "flat" shape. Fibers of component A preferably comprise steel (more preferably amorphous steel), carbon, or other material having the required modulus, namely, at least 30 GigaPascals (more preferably at least 35 GPa, and most preferably at least 40 GPa).

The second fiber component B is operative to enhance the toughness of FRC material at larger deformations (e.g., wider crack openings), and is therefore operative to increase the fracture energy needed to bring cracked FRC material to complete failure (e.g., total crumbling or breakage). These fibers should have an aspect ratio (length/equivalent diameter) of 25–125 (preferably 30–80) and a length of 10–100 mm., and more preferably 20–55 mm, so as to span larger crack openings and transfer stresses across the fracture surfaces in the FRC material and thus increase resistance to breakage forces through their embedment in the concrete and their ability to absorb fracture energy. The volume of component A to component B fibers should be at least 1:2 and more preferably at least 1:3.

Preferably, steel and polyolefin fibers, when used in the present invention, have deformed shapes, such as a hooked-end, crimped, twin-coned, or other non-straight shape to improve the bond to the cement paste.

Thus, the shape of the fibers and relative (volume) percentages of fibers (not to mention the variability of material) of the present invention are quite different than the prior art hybrid fiber systems discussed in the background above.

The present invention is not limited in terms of the fiber materials, as noted above. Exemplary component A fibers of the present invention can be made of steel, such as, for example, amorphous steel (e.g., non-crystalline) fibers having a width to thickness ratio ranging from 10 to 200, and a length ranging from 5–50 mm, and more preferably 5 to 25 mm. Carbon fibers, which have a high elastic modulus, can also be used as component A of this fiber system. The main purpose of these fibers of component A is to improve the strength of the matrix and to improve the crack resistance at small crack openings. It is also possible to use other materials having the requisite minimum Young's modulus (at least 30 GPa).

Exemplary component B fibers of the present invention should be fibers that are operative to transfer stresses across the fracture surface (across the crack opening). These fibers have to increase the resistance against crack propagation, which improves the toughness at larger crack openings. This is considered to be a "crack bridging effect." These fibers of component B can be made of steel (preferably hooked-end steel fibers which have enhanced pull-out resistance) or polyolefin fibers (preferably fibrillated), such as polyethylene, polypropylene, and the like. The dosage rate of these fibers is 0.5 vol. %–5.0 vol. %, and more preferably 0.75 vol. %–2 vol. %. They should have a length of 10–100 mm., and more preferably 20–55 mm, and preferably have a length to equivalent diameter ratio of 30–80. In concrete, the preferred volume amount of component B fibers is at least 2 times that of component A fibers.

The toughness and ductility of concrete systems, when component A and B fibers were incorporated, were tested as in the following illustrative example.

EXAMPLE 1

Flexural toughness measurements were taken of four different concrete samples which were molded into a beam shape measuring 100 mm by 100 mm by 300 mm. A first sample was plain (non-reinforced concrete); a second sample contained component A fibers (steel) only; a third sample contained component B fibers (polyolefin) only; and a fourth sample contained a hybrid combination of fiber components A and B.

FIG. 1 shows load displacement curves of the 4 different test samples using a Japanese Yoke deflection measuring system. The fracture behavior of the plain concrete beam is very brittle, which is indicated by the steep drop of the load after the maximum load has been reached. The crack resistance for crack propagation is very small and, therefore, the fracture toughness, which is proportional to the area under the load versus deflection curve, is very small.

When 0.25 vol. % of a 30 mm long amorphous steel fiber with a width to thickness ratio of 70 was added to the concrete, the flexural strength as well as the flexural toughness improved in comparison to the control concrete beam which lacked reinforcing fibers. The load-carrying capacity of component A dropped with increasing deflection of the beam.

When 1 vol. % of 51 mm. length polyolefin fibers was added to the concrete, the flexural strength did not increase, but the toughness increased with increasing deflection after the load dropped to 50% of its maximum. This clearly demonstrates that component B does not improve ductility at very small crack openings but only at larger crack openings.

When both components A and B were added to the concrete, the flexural toughness improved'at small and large deflections. While this confirms that a combination of the different fiber components outperformed each component alone, more significantly it supports the present inventors' view that a hybrid system using relatively smaller overall amounts of fiber can nevertheless improve ductility when both small and larger crack openings are taken into account.

For example, the hooked-end steel fibers provide so much resistance against fiber pullout that fiber reinforced concrete beams still can carry a lot of load even at large crack openings.

An understanding of the features and further advantages of the present invention may be facilitated by a discussion about brittleness and ductility. There are several ways to derive expressions for brittleness or ductility. Originally, the brittleness number b was defined as being proportional to the ratio of stored elastic energy and the fracture energy GF necessary to achieve complete failure.

$$b = \frac{\sigma_{max}^2 \cdot L}{G_F \cdot E} \quad (1)$$

where $\sigma_{max}$ is the tensile strength, E is the Young's modulus, and L is the length of the specimen. It is evident that a lower strength and a higher fracture energy increases the ductility of the material. The brittleness number b is inversely proportional to the characteristic length $l_{ch}$, which is used to characterize the influence of the material properties without taking the shape of the specimen into account $$l_{ch} = \frac{G_F \cdot E}{\sigma_{max}^2} \quad (2)$$

The characteristic length $l_{ch}$ can be used as a figure-of-merit for the "ductility" of a material. $l_{ch}$ is closely related to the parameter R"" defined by Hasselman as a figure-of-merit for the thermal shock resistance $$R'''' = \frac{2 \cdot G_F \cdot E}{\sigma_{max}^2} \quad (3)$$

The parameter R "" is proportional to the ratio of the fracture energy for crack propagation GF to the fracture energy for crack initiation $G_{Ic}$ $$R'''' \propto \frac{G_F}{G_{Ic}} \quad (4)$$

As a measure for the energy for crack initiation the critical energy release rate $G_{Ic}$ was calculated from the critical stress intensity factor $K_{Ic}$ at crack initiation according to Irwin (assuming the assumptions of linear elastic fracture mechanics theory can be applied at the maximum load):

$$G_{Ic} = \frac{K_{Ic}^2}{E} \text{ with } K_{Ic} = k \cdot P_{max} \quad (5)$$

where k is specimen geometry dependent parameter and $P_{max}$ is the maximum load. It goes without saying that $l_{ch}$ for concrete can only be increased by increasing the fracture energy. A decrease of the tensile strength or the energy for crack initiation is not desired, because of the negative influence on the compressive strength, which also would decrease. Equation 4 and 5 show basically how much the fracture energy GF has to change, if the strength varies, assuming that the ductility remains constant.

By considering fracture energy characteristics at both small and large crack deformations, moreover, the present inventors have taken into account the necessity to consider Young's modulus characteristics for enhancing ductility at small crack openings, and the need to have large-fiber surface-area to fiber volume ratios and different respective lengths in the hybrid fiber system (to bridge larger crack deformations), so as to achieve overall enhanced toughness and ductility in fiber-reinforced concrete (FRC) without relying upon high (1%) volumes of steel fibers and the disadvantages which accompany such high volumes in FRC.

In further embodiments of the invention, the present inventors have considered incorporating a further component comprising a crack-control agent (sometimes referred to as shrinkage control agent), corrosion-control agent, or mixture thereof. Such agents are generally known in the cement and concrete industries. For example, calcium nitrite may be incorporated into the concrete (and/or coated onto the fibers) to improve strength, and, particularly where an electrically conductive fiber (A or B) is used, (e.g., steel, carbon) to resist cathodic effects when used in concrete having embedded rebar. Calcium nitrite also appears to increase strength, toughness, and ductility of FRC (but only the strength of ordinary concrete). Thus, a preferred embodiment of the fiber-reinforcing system comprises the fiber components A and B described above, wherein at least one of said fiber components comprises steel, and preferably 1–2% (s/s cement in the concrete) of calcium nitrite for inhibiting cathodic effect of conductive fibers (and for inhibiting corrosion of steel fibers). In other exemplary embodiments, a crack control admixture may be incorporated (and/or coated onto the fibers). For example, crack control admixtures are taught in U.S. Pat. Nos. 5,556,460; 5,413,634; 5,618,344; 5,779,778; 5,326,397; 5,326,396; 5,389,143; 5,626,663; 5,604,273; 5,622,558; 5,603,760; 5,571,319; and 5,679,150, all of which are incorporated herein by reference. A suitable fiber coating for enhancing concrete bonding strength and improving pull-out resistance is taught in U.S. Pat. No. 5,753,368 of N. Berke et al., and this also is incorporated herein by reference. Accordingly, known corrosion control admixtures, fiber coatings, and crack control admixtures can be incorporated in further embodiments of the exemplary hybrid fiber systems herein described.

The foregoing examples are provided by way of illustration only and are not intended to limit the scope of the invention.

It is claimed:

1. A hybrid fiber system for reinforcing concrete comprising:
   (a) a first component A comprising fibers having a Young's modulus of at least 30 GigaPascals and having a width to thickness ratio of 10–200, and an average length of 5–50 mm; and
   (b) a second component B comprising fibers having a length to thickness ratio of 25–125, an average length of 10–100 mm.; the volume ratio of component A to component B being at least 1:2.

2. The system of claim 1 wherein said fibers of said first component A comprise a material selected from metal and carbon.

3. The system of claim 1 wherein said fibers of said second component B comprise a material selected from metal and polyolefin.

4. The system of claim 1 wherein said fibers of said first component A comprise amorphous steel, and said fibers of said second component B comprise deformed steel, polyolefin, or a mixture thereof.

5. The system of claim 4 wherein said fibers of second component B comprise a polyolefin comprising polyethylene, polypropylene, or mixture thereof.

6. The system of claim 4 wherein said fibers of second component B comprise hooked-end steel fibers.

7. The system of claim 1 wherein said fibers of said first component A are amorphous steel and have a length from 10–35 mm.

8. The system of claim 1 wherein said fibers of said second component B are polyolefin and have a length from 20–55 mm.

9. The system of claim 1 wherein said fibers of first component comprise amorphous steel, said fibers of second component B comprise a polyolefin, and the volume ratio of component B to A is at least 3:1.

10. The system of claim 1 further comprising a corrosion inhibitor coated on said fibers or to be incorporated into the concrete to be reinforced.

11. The system of claim 1 further comprising a crack control agent coated on said fibers or to be incorporated into the concrete to be reinforced.

12. A cementitious composition comprising a cement binder and a fiber system comprising:
 (a) a first component A comprising fibers having a Young's modulus of at least 30 GigaPascals and having a width to thickness ratio of 10–200, and an average length of 5–50 mm; and
 (b) a second component B comprising fibers having a length to thickness ratio of 25–125, an average length of 10–100 mm.; the volume ratio of component A to component B being at least 1:2.

13. The composition of claim 12 further comprising an additional component comprising a crack control agent, corrosion inhibitor, or mixture thereof.

14. Method for enhancing ductility of a concrete comprising incorporating
 (a) a first component A comprising fibers having a Young's modulus of at least 30 GigaPascals and having a width to thickness ratio of 10–200, and an average length of 5–50 mm; and
 (b) a second component B comprising fibers having a length to thickness ratio of 25–125, an average length of 10–100 mm.; the volume ratio of component A to component B being at least 1:2.

* * * * *

UNITED STATES PATENT AND TRADEMARK OFFICE
CERTIFICATE OF CORRECTION

| | | |
|---|---|---|
| PATENT NO. | : 6,071,613 | Page 1 of 1 |
| APPLICATION NO. | : 09/185253 | |
| DATED | : June 6, 2000 | |
| INVENTOR(S) | : Klaus Alexander Rieder and Neal S. Berke | |

It is certified that error appears in the above-identified patent and that said Letters Patent is hereby corrected as shown below:

In column 6, line 47, and in column 8, lines 2 and 15, the word "thickness" should read --diameter--.

Signed and Sealed this

Twenty-seventh Day of March, 2007

JON W. DUDAS
*Director of the United States Patent and Trademark Office*